United States Patent [19]

Ulan et al.

[11] Patent Number: 5,618,437
[45] Date of Patent: Apr. 8, 1997

[54] PROCESS FOR REMOVING SULPHATE FROM AQUEOUS SOLUTION

[75] Inventors: Judith G. Ulan, Richmond; Kenneth R. Maycock, White Rock; Thomas S. Drackett; Felix M. F. Mok, both of Vancouver, all of Canada

[73] Assignee: Chemetics International Company Ltd., Vancouver, Canada

[21] Appl. No.: 246,091

[22] Filed: May 19, 1994

[51] Int. Cl.⁶ .................................................. B01D 15/04
[52] U.S. Cl. ............................................ 210/679; 210/683
[58] Field of Search ........................................ 210/679, 683

[56] References Cited

U.S. PATENT DOCUMENTS

| | | | |
|---|---|---|---|
| 4,178,270 | 12/1979 | Fujita et al. | 210/679 |
| 4,415,677 | 11/1983 | Lee et al. | 521/28 |
| 4,556,463 | 12/1985 | Miaz et al. | 204/98 |
| 5,071,563 | 12/1991 | Shiga et al. | 210/670 |

FOREIGN PATENT DOCUMENTS

| | | |
|---|---|---|
| 4321514 | 11/1992 | Japan . |
| 4334553 | 11/1992 | Japan . |
| 4338110 | 11/1992 | Japan . |

*Primary Examiner*—Ivars Cintins
*Attorney, Agent, or Firm*—Cushman Darby & Cushman IP Group Pillsbury Madison & Sutro LLP

[57] ABSTRACT

A method for removing sulphate ions from an aqueous solution of an alkali metal halide containing sulphate ions, which method comprises contacting said solution with a particulate, composite ion-exchange material comprising a hydrous oxide of a metal selected from the group consisting of titanium, zirconium and cerium, dispersed on a support comprising a brine solution compatible material. Preferably the compatible material is selected from hydrous oxides of titanium, cerium and zirconium. An improved cost-effective practical method of sulphate removal is provided.

15 Claims, 1 Drawing Sheet

5,618,437

PROCESS FOR REMOVING SULPHATE FROM AQUEOUS SOLUTION

FIELD OF THE INVENTION

This invention relates to a process for the removal of sulphate ion from an alkali metal halide solution, particularly when the alkali metal halide is used in the manufacture of sodium chlorate or chlorine and caustic soda and contains the alkali metal sulphate as an impurity. More particularly, it relates to the removal of sulphate ions by selective adsorption with selected metal oxides.

BACKGROUND TO THE INVENTION

Sodium chlorate is generally prepared by the electrolysis of sodium chloride wherein the sodium chloride is electrolyzed to produce chlorine, sodium hydroxide and hydrogen. The chlorine and sodium hydroxide are immediately reacted to form sodium hypochlorite, which is then converted to chlorate and chloride under controlled conditions of pH and temperature.

Thus, within the electrolytic system, sodium chloride is, in effect, combined with water to form sodium chlorate and hydrogen gas. The electrolysis takes place typically at 60° C. to 90° C. in electrolytic cells comprising anodes, which may be a precious metal or metal oxide coated titanium, and, typically, steel cathodes.

In another chemical process, chlorine and caustic soda are prepared in an electrolytic cell, which contains a membrane to prevent chlorine and caustic soda reacting and the separated chemicals removed.

The sodium chloride salt used to prepare the brine for electrolysis to sodium chlorate generally contains impurities which, depending on the nature of the impurity and production techniques employed, can give rise to plant operational problems familiar to those skilled in the art. The means of controlling these impurities are varied and include, purging them out of the system into alternative processes or to the drain, precipitation by conversion to insoluble salts, crystallization or ion exchange treatment. The control of anionic impurities presents more complex problems than that of cationic impurities.

Sulphate ion is a common ingredient in commercial salt. When such salt is used directly, or in the form of a brine solution, and specific steps are not taken to remove the sulphate, the sulphate enters the electrolytic system. Sulphate ion maintains its identity under the conditions in the electrolytic system and thus accumulates and progressively increases in concentration in the system unless removed in some manner. In chlorate plants producing a liquor product, the sulphate ion will leave with the product liquor. In plants producing only crystalline chlorate, the sulphate remains in the mother liquor after the crystallization of the chlorate, and is recycled to the cells. Over time, the concentration of sulphate ion will increase and adversely affect electrolysis and cause operational problems due to localized precipitation in the electrolytic cells. Within the chloralkali circuit the sodium sulphate will concentrate and adversely effect the membrane, which divides the anolyte (brine) from the catholyte (caustic soda).

It is industrially desirable that sodium sulphate levels in concentrated brine, e.g., 300 g/l NaCl be reduced to at least 20 g/l in chlorate production and 10 g/l in chloralkali production.

U.S. Pat. No. 4,702,805, Burkell and Warren, issued Oct. 27, 1987, describes an improved method for the control of sulphate in an electrolyte stream in a crystalline chlorate plant, whereby the sulphate is crystallized out. In the production of crystalline sodium chlorate according to U.S. Pat. No. 4,702,805, sodium chlorate is crystallized from a sodium chlorate rich liquor and the crystals are removed to provide a mother liquor comprising principally sodium chlorate and sodium chloride, together with other components including sulphate and dichromate ions. A portion of the mother liquor is cooled to a temperature to effect crystallization of a portion of the sulphate as sodium sulphate in admixture with sodium chlorate. The crystallized admixture is removed and the resulting spent mother liquor is recycled to the electrolytic process.

It has been found subsequently, that the crystallized admixture of sulphate and chlorate obtained from typical commercial liquors according to the process of U.S. Pat. No. 4,702,805 may be discoloured yellow owing to the unexpected occlusion of a chromium component in the crystals. The discolouration cannot be removed by washing the separated admixture with liquors in which the crystallized sulphate and chlorate are insoluble. It will be appreciated that the presence of chromium in such a sulphate product is detrimental in subsequent utilization of this product and, thus, this represents a limitation to the process as taught in U.S. Pat. No. 4,702,805.

U.S. Pat. No. 4,636,376 — Maloney and Carbaugh, issued Jan. 13, 1987, discloses removing sulphate from aqueous chromate-containing sodium chlorate liquor without simultaneous removal of significant quantities of chromate. The chromate and sulphate-containing chlorate liquor having a pH in the range of about 2.0 to about 6.0 is treated with a calcium-containing material at a temperature of between about 40° C. and 95° C., for between 2 and 24 hours to form a sulphate-containing precipitate. The precipitate is predominantly glauberite, $Na_2Ca(SO_4)_2$. However, the addition of calcium cations requires the additional expense and effort of the treatment and removal of all excess calcium ions. It is known that calcium ions may form an unwanted deposit on the cathodes which increases the electrical resistance of the cells and adds to operating costs. It is, typically, necessary to remove calcium ions by means of ion exchange resins.

U.S. Pat. No. 5,093,089—Alford and Mok, issued Mar. 3, 1992 describes an improved version of the selective crystallization process of aforesaid U.S. Pat. No. 4,702,805, wherein process conditions are selected to provide precipitation of sulphate substantially free of chromium contaminant.

Typically, organic anion exchange resins have a low selectivity for sulphate anions in the presence of a large excess of chloride ions. U.S. Pat. No. 4,415,677 describes a sulphate ion absorption method, but which method has disadvantages.

The method consists of removing sulphate ions from brine by a macroporous ion exchange resin composite having polymeric zirconium hydrous oxide contained in a vessel. This method is not economical because the efficiency is low and a large amount of expensive cation exchange resin is required for carrying polymeric zirconium hydrous oxide. Further, the polymeric zirconium hydrous oxide adsorbing Sulphate ions comes into contact with acidic brine containing sulphate ions, resulting in loss of polymeric zirconium hydrous oxide due to acid-induced dissolution. Soluble zirconyl ions precipitates as hydroxide in the lower portion of the vessel to clog flow paths.

U.S. Pat. No. 4,556,463—Minz and Vajna issued Dec. 3, 1984, describes a process to decrease sulphate concentration levels in brine solutions using an organic ion exchange material with brine streams under carefully controlled dilutive conditions.

U.S. Pat. No. 5,071,563—Shiga et al, issued Dec. 10, 1991, describes the selective adsorption of sulphate anions from brine solutions using zirconium hydrous oxide slurry under acidic conditions. The ion exchange compound may be regenerated by treatment with alkali.

Japanese Patent Kokai No. 04321514-A, published Nov. 11, 1992 to Kaneka Corporation describes the selective adsorption of sulphate anions from brine solutions using cerium hydroxide slurry under acidic conditions. The ion exchange compound may be regenerated by treatment with alkali.

Japanese Patent Kokai No. 04338110-A— Kaneka Corporation, published Nov. 25, 1992 describes the selective adsorption of sulphate anions from brine solutions using titanium hydrous oxide slurry under acidic conditions. The ion exchange compound may be regenerated by treatment with alkali.

Japanese Patent Kokai No. 04334553-A— Kaneka, published Nov. 11, 1992 describes the removal of sulphate ions from brine using ion-adsorbing cakes in a slurry.

There still remains, however, a need for an improved, cost-effective, practical method for the removal of sulphate ions from alkali metal halide solutions, particularly, from sodium chloride solutions used in the electrolytic production of sodium chlorate and chlorine/caustic soda.

SUMMARY OF THE INVENTION

Surprisingly, we have now found an improved process for the removal of sulphate ions from aqueous solutions of alkali metal halides containing sulphate ions, which process uses a selective hydrous oxide dispersed on the surface of a suitable support.

It is, thus, an object of the present invention to provide an improved rapid and efficient method for removing sulphate ions from an aqueous solution of an alkali metal halide containing sulphate ions.

It is a further object of the present invention to provide a composite ion-exchange material for the rapid and efficient removal of sulphate ions from an aqueous solution of an alkali metal halide containing the sulphate ions.

It is a yet further object of the present invention to provide a sulphate-removing composite ion exchange material which has good handling properties, acceptable acid insolubilities and offers enhanced sulphate removal from brine solutions.

It is a still yet further object to prove a simple and efficacious method of preparing the aforesaid composite ion-exchange material.

Accordingly, in one aspect the invention provides a method for removing sulphate ions from an aqueous solution of an alkali metal halide containing sulphate ions, which method comprises contacting said solution with a particulate composite ion-exchange material comprising a hydrous oxide of a metal selected from the group consisting of titanium, zirconium and cerium, and a support material comprising a brine solution-compatible material.

By the term "brine solution compatible" is meant a material that is substantially insoluble in brine solutions over the pH range 2–7, i.e. having a solubility of less than 1 ppm at 25°–85° C.

Preferably, the alkali metal halide is an alkali metal chloride and, more preferably, sodium chloride.

The support material, per se may constitute an active sulphate anion absorbing ion-exchange material, such as a hydrous oxide of a metal as hereinbefore defined.

We have found that hydrous oxides of the general formula $MO_2\text{-}xH_2O$, wherein M is selected from titanium, zirconium and cerium and x is 0.3 to 7 to be of particular value.

The chemical formula of the hydrous metal oxides of use in the practice of the invention may be written in several ways. The general formula may be written as $MO(OH)_2\text{-}y\ H_2O$, where M is Zr, Ce or Ti, and y ranges from 0 to 6. This representation suggests something of the structural units responsible for the materials insolubility and ion exchange ability. The M-oxygen bonds impart insolubility and the hydroxide groups provide ion exchange capability. X and Y include values which are not necessarily integers.

Another designation having the general formula, $MO_2\text{-}xH_2O$ where x ranges from 0.3 to 7.0, preferably, 0.5 to 4 in the present invention, encompasses both the hydrous oxide $MO_2\text{—}H_2O$, also written as $MO(OH)_2$ and more hydrated hydrous oxides $MO(OH)_2\text{—}H_2O$, without requiring a separate designation.

While not being bound by theory, we believe the oxides must be in the hydrous form to exchange sulphate, $MO_2xH_2O$ wherein M=Zr, Ce or Ti, x ranges from 0.3 to 7 and, thus, possess exchangeable hydroxyl groups. Anhydrous oxide, $MO_2$ is ineffective.

According to the following equation:

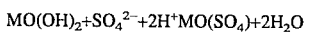

$$MO(OH)_2 + SO_4^{2-} + 2H^+ \rightarrow MO(SO_4) + 2H_2O$$

in theory, only one mole of hydrous metal oxide is required to absorb one mole of sulphate. However, in practice between 5–200 moles of hydrous metal oxide are required for each mole of sulphate.

Sulphate absorption efficiency is dependent both on the degree of hydration and available surface of the anion exchanger material. The material must be hydrated to possess exchangeable hydroxyl groups. These exchangeable hydroxyl groups must be at or near the surface of the anion exchange material to participate in ion-exchange.

The optimal degree of hydration to ensure insolubility appears to correspond to an overall formula of $MO_2.xH_2O$ (x ranges from 0.3 to 7), which is obtained in practice by controlling precipitation and drying conditions. For the hydrous oxides of zirconium, cerium and titanium this corresponds to a maximum degree of hydration of between 50% –60%.

The present invention provides an improved method of adsorbing sulphate anions from a brine solution by providing the absorbing ion-exchange material in very fine particulate form on the surface of a much larger particulate support material. The composite material is thus of a sufficiently large particle size as to allow the material to settle and be readily filtered out of the brine solution. The absorbing ion-exchange material is thus finely dispersed on the surface of the larger particle size material to provide a relatively high proportion of surface hydoxyl groups for sulphate absorption. The present invention is of value over existing methods as it utilizes a technique of increasing the available surface area for anion exchange. However, we have found that careful pH control is required because the very fine hydrous oxides are slightly more soluble at low pH than is bulk hydrous oxide of greater particle size.

The present invention thus provides higher sulphate removal efficiency per mole of expensive hydrous oxide, while inexpensive support material is utilized. However, it is within the scope of the invention that a hydrous oxide as hereinabove defined may constitute the support material.

Surprisingly, we have found that the composite material is equally efficacious at temperatures ranging from 20° C. to 80° C. In contrast, brine slurries of hydrous cerium oxide and hydrous zirconium oxide, per se, must be heated to be effective. This observation is most significant in that the composite material can thus be used in removing sulphate from brine solutions containing chlorate at relatively low temperatures under reasonably low pH conditions while reducing the undesired acid decomposition of chlorate to chlorine and chlorine dioxide gases.

While the relative amount of the fine particulate hydrous oxide dispersed on the support surface may be readily determined by the person skilled in the art for the particular duty required, we have found that a 10% w/w loading provides most satisfactory results. Thus, the fine hydrous metal oxide may be dispersed and adsorbed on the surface of the support in a suitable, effective amount sufficient to efficaciously remove sulphate ions. A weight loading of from 1 to 50%, preferably 8–20% w/w, has been found to be most effective in removing sulphate ions rapidly and efficiently from brine solutions. The fine particulate material may be so fully and extensively dispersed on the surface of the support as to essentially constitute almost a full coating or layer This is particularly so when the support is anhydrous $TiO_2$, $CeO_2$, $ZrO_2$, $SiO_2$, $Al_2O_3$ and brine compatible ceramic oxides. The particle size may be determined from scanning election micrographs.

In a further aspect, the invention provides a method as hereinbefore defined wherein said composite material comprises a first hydrous oxide of a first metal selected from the group consisting of titanium, zirconium and cerium dispersed on the surface of said support, wherein said support comprises a second hydrous oxide of a second metal selected from the group consisting of titanium, zirconium and cerium, provided that when said first metal and said second metal are the same, about 90% by number of the particles of said second hydrous oxide is at least ten times greater in size than 90% by number of the particles of said first hydrous oxide.

In a further aspect, the invention provides a method as hereinbefore defined, wherein when said support material has a particle size selected from the range of 0.1μm–300μm, the hydrous oxide adhered to the support material has a particle size of 0.01μm–30μm, preferably, less than 1μm and when said support material has a particle size selected from the range of 300μm–1500μm, the hydrous oxide adhered to the support material has a particle size of 0.1μm–100μm, preferably, less than 50μm. In each case the particle size of the dispersed hydrous oxide is, generally, at least 10 times smaller than that of the support.

In a further aspect the invention provides a particulate, composite ion exchange material for use in removing sulphate ions from an aqueous solution of an alkali metal halide, said material comprising a hydrous oxide of a metal selected from the group consisting of titanium, zirconium and cerium, dispersed on a support comprising a brine solution-compatible material.

In yet a further aspect the invention provides a method as hereinabove defined wherein said aqueous solution is mixed with said composite ion-exchange material at a pH selected from 2 to 6.

Accordingly, in a still yet further aspect the invention provides a method for removing sulphate ions from an aqueous solution of an alkali metal halide containing sulphate ions, which method comprises contacting said solution with a particulate, composite ion-exchange material comprising a hydrous oxide of a metal selected from the group consisting of titanium, zirconium and cerium, dispersed on a support comprising a brine solution compatible material.

Thus, in an alternative embodiment of the invention a multi-stage process for removing sulphate anions is provided. This is best achieved by means of a multistage process using a multi-column ion-exchange bed. In this application, it is most preferred that a particle size of >50 microns for the support material be utilized to better facilitate handling. We have found that there are handling problems associated with powders, such as the hydrous oxide particles used as ion exchangers in the present invention. Very fine particles do not settle readily, making complete separation of sulphate depleted brine solution and ion exchanger difficult. If the particle size of the mixed hydrous oxide particle is in the range of 20-100μm preferably the surface adhering hydrous oxide particles will have a mean particle size of <μm. In each case about 90% by number of the particles of said adhered hydrous oxide is at least ten times smaller in size than 90% by number of particles of said hydrous oxide support. When the particle size of the mixed hydrous oxide particle is in the range of 20-100μm sulphate removal will preferably be carried out by the following procedure:

(A) mixing of the concèntrated brine solution with the ion exchanger to form a slurry;

(B) addition of the acid in a controlled manner such that sufficient acid is added to effect the removal of sulphate while ensuring that the pH does not drop to levels where significant dissolution of hydrous oxide is observed;

(C) separation of the sulphate depleted brine from the ion exchanger by filtration;

(D) regeneration of the ion exchanger and release of the sorbed sulphate to an aqueous basic waste stream by slurry of the solid with an aqueous basic solution; and (E) separation of the solid from solution by filtration for re-use in sulphate sorption from concentrated brine.

The disadvantages of this procedure include the difficulty of avoiding carryover of fine particles with the sulphate depleted brine. Additionally, the filtering and transfer of fine particles requires equipment which requires relatively high maintenance. It is preferred that the hydrous ion exchanger is contained in a column and contacted with sulphate containing brine solution such that the sulphate depleted brine is obtained upon exiting the column. The fine particle size of the hydrous oxide makes this approach somewhat unfavoured as a high back pressure is required to drive a solution through such a densely packed powder. Larger particles are, thus, desired for a column application. Larger particles can be formed by sintering of fine powders. However the temperatures required for sintering results in a loss of active hydroxyl groups and consequently a loss in sulphate removal ability. The teachings herein show that the efficiency of the active hydrous oxide material is increased by dispersing it on a support material, and show that a column design is practical. The column material is composed of a large particle size porous support (preferably of a diameter greater than 300 microns, more preferably greater than 500 microns) of a brine compatible material that is active for sulphate removal, but most likely is an anhydrous porous oxide. This support is either purchased commercially or obtained by sintering of the hydrous oxide powders to form particles of the required size and mechanical stability. Active hydrous oxide is deposited on this support according to the method taught in this disclosure. Sulphate removal from concentrated brine is then be carried out according to the following procedure:

(A) sulphate containing concentrated brine is introduced into the column;

(B) acid is added and sulphate sorbed onto the ion exchanger;

(C) sulphate depleted brine exits the column; and (D) a basic aqueous solution is introduced onto the column and an aqueous sulphate containing waste stream produced.

It is necessary to control the addition of acid to the concentrated brine while in contact with the column material, both to ensure sufficient acid is added to effect the sorption of sulphate and also to ensure that dissolution of active hydrous oxide is not occurring. To achieve this, a multibed column is used in which successive amounts of acid are added at separate stages, rather than all at once at the beginning, to provide sufficient acid for sulphate removal and avoid any low pH conditions which leads to hydrous oxide dissolution. Such column utility is an improvement over a slurry in terms of ease of separation of the sulphate depleted brine from the ion exchanger. Regeneration of the ion exchanger does not require stepwise addition of base as the ion exchanger is insoluble at high pH and is performed by adding an aqueous solution that already contains dissolved base. Fine particle hydrous oxide as taught in the prior art would not be acceptable in this embodiment. In fact, the mixed hydrous oxide dispersed on stable large particle supports as taught in this disclosure is a required column material as such a composite may be synthesized with the necessary support particle size while still retaining sufficient efficiency. Thus, we have found that by dispersing fine particles of hydrous oxide upon the surface of a relatively larger particle of support material that unexpected, advantageous efficacious removal of sulphate anion from brine solutions can be achieved. Preferably, when said support has a particle size selected from the range of 300 to 1500 μm, the hydrous oxide adhered to the support material has a particle size of 0.1 to 100 μm, preferably less than 50 μm. In each case the particle size of the dispersed hydrous oxide is at least 10 times smaller than that of the support. The composite ion exchange mixtures according to the invention generally are made from an aqueous slurry of a solution of a soluble salt of the metal and dispersed solid support material in particulate form to which an aqueous base solution, preferably sodium hydroxide, is added to cause precipitation of finely dispersed hydrous metal oxide onto the suspended support material. The resultant composite particles may be separated from the slurry by conventional techniques as hereinafter described, or, preferably, used directly by the addition of the slurry to the sulphate-containing brine liquor. We have discovered that the solubilities of the hydrous oxides when made as described hereinbefore are enhanced in relatively low pH solutions over bulk hydrous metal oxide. Accordingly, careful control of pH is required. The pH of the aqueous liquid is, preferably, adjusted to a value selected from the range from about 2 to 4, preferably, by the addition of hydrochloric acid. Removal of sulphate ion is more efficacious as the pH is lowered, but the solubility of the hydrous oxide increases.

BRIEF DESCRIPTION OF THE DRAWING

In order that the invention may be better understood, embodiments, including preferred embodiments, will now be described by way of example only with reference to the following examples, wherein.

DETAILED DESCRIPTION OF THE INVENTION

EXAMPLE 1

Figure 1:
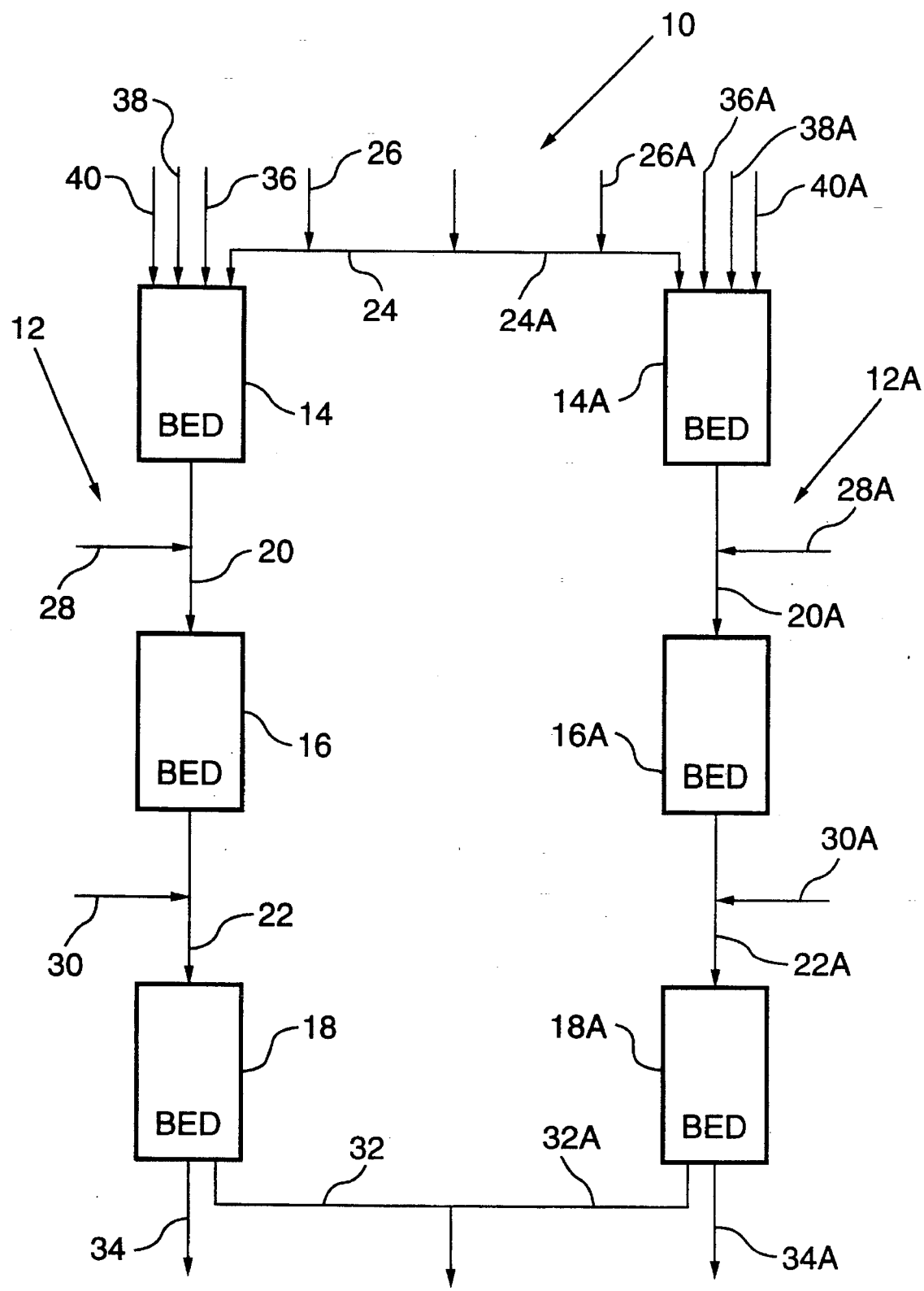
FIG. 1 represents a block diagram flow chart of a method according to the invention.

Preparation:

10% $CeO_2$-$4H_2O$/$TiO_2$ was prepared by adding 90.0 g of $TiO_2$ to a solution composed of 437 ml 0.1N ceric sulphate in sulphuric acid and 200 ml of $H_2O$. To precipitate hydrous cerium oxide onto titanium oxide, 315 ml of 2.5 N sodium hydroxide was added dropwise while the slurry was stirred. The solid product was filtered, washed and dried at 100° C. for 3 hrs to produce a hydrous cerium oxide on titanium oxide composite ion exchange composition (101.5 g).

Scanning electron microscopy (SEM) of the hydrous cerium oxide on titanium oxide revealed that the 0.5 micron titanium oxide particles are coated with a thin homogeneous layer of hydrous cerium oxide particles.

characterization of Hydrous Cerium Oxide on Titanium Oxide Product:

weight: 101.5 g (10.6 g $CeO_2$-$xH_2O$/90.9 g $TiO_2$)

weight loading: 10.4 wt % $CeO_2$-$4H_2O$/$TiO_2$

Degree of hydration: $CeO_2$-$4H_2O$ (MW=244)

Molar ratio: 1 $CeO_2$-$4H_2O$:26 $TiO_2$

% $H_2O$ calculation therefrom:

1 $CeO_2$=172 g

26 $TiO_2$=2080 g

4 $H_2O$=72 g

Total=2324 g

% $H_2O$=(72/2324)×100=3%

I. Sulphate Removal from Concentrated Brine:

Sulphate removal efficiency was determined by adding 15.22 g of hydrous cerium oxide on titanium oxide to 100 ml of a solution composed of 10 g/l sodium sulphate, $Na_2SO_4$, in 300 g/l sodium chloride, NaCl. The ratio of hydrous cerium oxide to sulphate is 0.93 moles $CeO_2$-$4H_2O$/moles $SO_4^=$. To this slurry 0.5 ml portions of 5 M HCl were added and the mixture heated to 70° C. The pH and sulphate level were measured after each addition of acid. Efficiency is defined as the moles of sulphate removed per mole of hydrous oxide ion exchanger, (IX). The efficiency for sulphate removal is shown in Table 1 as a function of pH.

Table 1: Sulphate Removal Efficiency as a Function of pH for 10 wt % $CeO_2$-$4H_2O$/$TiO_2$

TABLE 1

|  | pH = 4 | pH = 3 | pH = 2 |
| --- | --- | --- | --- |
| Efficiency in moles $SO_4^=$/mole IX | 0.16 | 0.19 | 0.21 |

The composite ion exchange composition was regenerated as follows:

The slurry was centrifuged and the supernatant removed. The solid was washed with two 100 ml portions of $H_2O$, after which a third 100 ml portion of $H_2O$ was slurried with the solid and 1 ml of 2.5N sodium hydroxide was added to complete the removal of sulphate. The pH was greater than 11 and analysis by IC (ion chromatography) indicated that all the adsorbed sulphate had been released into solution.

II. Sulphate Removal from Chlorate Liquor:

Sulphate removal from chlorate liquor was determined by adding 5 g of hydrous cerium oxide on titanium oxide to 50 ml of a solution composed of 18 g/l sodium sulphate, $Na_2SO_4$, 460 g/l sodium chlorate, $NaClO_3$, 120 g/l sodium chloride, NaCl and 5 g/l sodium dichromate, $Na_2Cr_2O_7$. The ratio of hydrous cerium oxide to sulphate is 0.31 moles $CeO_2$-$4H_2O$/mol $SO_4^=$. To this slurry 0.5 ml of 5 N HCl was added while the temperature was maintained as ambient. The pH and sulphate level were measured. Efficiency is defined as the moles of sulphate removed per mole of hydrous oxide ion exchanger. The efficiency for sulphate removal is 0.16 moles of $SO_4^=$/mole of $CeO_2$-$4H_2O$ at a pH of 4.

There was a slight odour of $Cl_2/ClO_2$. However, it was established by IC that there was very little chlorate loss after the addition of acid.

To regenerate the composite ion exchange composition, the slurry was centrifuged and the supernatant removed. The solid was washed with two 50 ml portions of $H_2O$, after which a third 50 ml portion of $H_2O$ was slurried with the solid and 0.5 ml of 2.5 N sodium hydroxide was added to complete the removal of sulphate. The pH was greater than 11 and analysis indicated that all the adsorbed sulphate had been released into solution. Analysis also showed that chlorate, chromate and chloride ions were not adsorbed to an appreciable extent and therefore the ion exchanger is selective towards sulphate in chlorate liquor.

III. Effect of Duty/Regeneration Cycles on Sulphate Removal from Brine:

The hydrous cerium oxide on titanium oxide ion exchange composition was recycled to determine the effect on efficiency.

A slurry composed of 5 g of 10 wt % $CeO_2$-$4H_2O$/$TiO_2$ in 35 ml of concentrated brine, 300 g/l NaCl, containing 10 g/l sodium sulphate, $Na_2SO_4$ was acidified with 1 ml of 5 N HCl. The pH and sulphate level were determined. The solid was then separated from the solution and washed with 35 ml of $H_2O$. After removing the wash solution another 35 ml of $H_2O$ was added along with 2 ml of 2.5 M NaOH. The pH and sulphate level were measured. The solution was removed and the solid washed with another 35 ml of $H_2O$ after which the sulphate removal cycle was repeated four times.

The pH during the sulphate sorption stage was below 2 and 0.32 moles $SO_4^=$/mole $CeO_2$-$4H_2O$ were sorbed for every cycle. No loss in efficiency was observed, in fact, a slight improvement was found upon repeated cycling. The pH during the sulphate desorption stage was above 10 and 0.29 moles of $SO_4^=$/mole $CeO_2$-$4H_2O$ was released. The discrepancy in quantities of sulphate sorbed and desorbed is attributed to sulphate removal during the intermediate rinsing stage. There was no loss in efficiency for desorption observed upon repeated cycling.

EXAMPLE 2

17% $ZrO_2$-$7H_2O$/$CeO_2$-$H_2O$ was prepared by adding 9.13 g of hydrous cerium oxide $CeO_2$-$H_2O$ powder to a solution composed of 2.4 g of $ZrOCl_2$-$8H_2O$ dissolved in 300 ml of $H_2O$. To precipitate hydrous zirconium oxide onto the hydrous cerium oxide particles, 6 ml of 2.5 N sodium hydroxide was added dropwise with stirring. The solid product was filtered, washed and dried at 100° C. for 3 hours to produce the composite ion-exchange composition (10.8 g).

Characterization of Hydrous Zirconium Oxide on Hydrous Cerium Oxide:

Weight: 10.8 g (9.1 g $CeO_2$-$H_2O$, 1.7 g $ZrO_2$-$xH_2O$)

Weight loading: 17 wt % $ZrO_2$-$7H_2O$/$CeO_2$-$H_2O$

Degree of hydration 1 $ZrO_2$-6.5 $CeO_2$-13 $H_2O$

% $H_2O$ calculation therefrom 6.5 $CeO_2$=1118 g $ZrO_2$=123 g

13$H_2O$=234 g total=1475

% $H_2O$=15%

Sulphate Removal from Concentrated Brine:

Sulphate removal efficiency was determined by adding 4.6 g of 17 wt % hydrous zirconlure oxide dispersed on hydrous cerium oxide, to 50 ml of solution composed of 10 g/l sodium sulphate, $Na_2SO_4$, in 300 g/l sodium chloride, NaCl. The ratio of total moles of hydrous oxide to moles of sulphate is 6.4. To this slurry was added 0.5 ml portions of 5 N HCl and the mixture stirred at room temperature. The pH and sulphate level were measured after each addition of acid. The efficiency for sulphate removal is shown in Table 2.

Table 2: Sulphate Removal Efficiency as a Function of pH for 17% $ZrO_2$-$7H_2O$/$CeO_2$-$H_2O$

|  | pH = 5 | pH = 4 | pH = 3 | pH = 2 |
| --- | --- | --- | --- | --- |
| Efficiency as moles $SO_4^=$/moles IX | 0.070 | 0.078 | 0.085 | 0.090 |

The composite ion exchange composition was regenerated as follows. Solid was separated from solution, washed with two 50 ml portions of $H_2O$ and reslurried with a third portion of 50 ml $H_2O$ to which 1 ml of 2.5M NaOH was added. The pH was greater than 11 and analysis indicated that all sulphate had been released into solution.

EXAMPLE 3

10% $CeO_2$-$2H_2O$/$TiO_2$-$H_2O$ was prepared by adding 15 g of powder hydrous titanium oxide $TiO_2$-$H_2O$ to 72 ml of a solution composed of aqueous 0.1 N ceric sulphate in sulphuric acid and 60 ml $H_2O$. To precipitate hydrous cerium oxide onto the hydrous titanium oxide 60 ml of 2.5N sodium hydroxide was added dropwise with stirring. The solid product was filtered, washed and dried at 100° C. for 2.5 hrs to produce the composite ion-exchange composition (16.5 g).

Scanning electron microscopy of this material showed hydrous titanium oxide particles with a size range from 2–50 microns coated with smaller particles (0.1 μm) of hydrous cerium oxide.

Characterization of Hydrous Cerium Oxide on Hydrous Titanium Oxide:

weight: 16.5 g (15 g $TiO_2$-$H_2O$, 1.5 g $CeO_2$-$xH_2O$)

weight loading: 10 wt % $CeO_2$-$2H_2O$/ $TiO_2$-$H_2O$

Degree of hydration: $CeO_2$-$2H_2O$ (MW=208 g/mol)

molar ratio: 1 $CeO_2$-$2H_2O$: 19 $TiO_2$-$H_2O$ % $H_2O$ $CeO_2$=172 g

19 $TiO_2$ (80 g/mol×19) 1520 g

2+19=21 $H_2O$ (18 g/mol) 378 g total=2070 g/mol

% $H_2O$=(378/2070)×100 18%

Sulphate Removal from Concentrated Brine:

Sulphate removal efficiency was determined by adding 11.5 g of hydrous cerium oxide dispersed on hydrous titanium oxide, 10 wt % $CeO$-$_2H_2O$/$TiO_2$-$H_2O$, to 100 ml of a solution composed of 10 g/l sodium sulphate, $Na_2SO_4$, in 300 g/l sodium chloride, NaCl. The ratio of hydrous oxide to sulphate is 5.5 mmol $CeO_2$-$2H_2O$ and 106 mmol $TiO_2$-

$H_2O$/7 mmol $SO_4^=$, or 16 moles of hydrous Ce and Ti/mole $SO_4^=$. To this slurry 1.0 ml and then 0.5 ml portions of 5 N HCl were added and the mixture heated to 70° C. The pH and sulphate level were measured after each addition of acid. The efficiency for sulphate removal is shown in Table 3.
Table 3: Sulphate Removal Efficiency as a Function of pH for 10 % $CeO_2$-$2H_2O$/$TiO_2$-$H_2O$

|  | pH = 4 | pH = 3 | pH = 2 |
| --- | --- | --- | --- |
| Efficiency in moles $SO_4^=$/mole IX | 0.014 | 0.023 | 0.033 |

The composite ion exchange composition was regenerated as follows. Solid was separated from solution, washed with two 100 ml portions of $H_2O$ and reslurried with a third portion of 100 ml $H_2O$ to which 2.5 ml of 2.5 M NaOH was added. The pH was greater that 11 and ion chromatography (IC) analysis indicated that all the sulphate had been released into solution.

EXAMPLE 4

Hydrous titanium oxide was prepared by dissolving 150 ml (0.43 moles) of tetrabutylortho titanate in 300 ml of n-hexanol and slowly adding 300 ml of $H_2O$ and then 100 ml of 25 wt % NaOH. The precipitate was filtered, washed and dried at room temperature to produce hydrated hydrous titanium oxide, $TiO_2$-$5.5H_2O$ (77.2 g). Hydrous titanium oxide was prepared by combining 66.5 g of $TiO_2$-$5.5H_2O$, hydrated hydrous titanium oxide, with 300 ml of $H_2O$ and 200 ml of 25% NaOH. The slurry was heated at 80° C. for 2 hours before the solid was filtered, washed and dried at 80° C. for 1 hour and then dried for 3 hours at 100° C. to form hydrous titanium oxide (20 g). Scanning electron microscopy of the hydrous titanium oxide imaged irregularly shaped particles with a size range from 2–30 microns.
Characterization of Hydrous Titanium Oxide.
  weight: 20 g
  Degree of hydration: $TiO_2$-$H_2O$
  % $H_2O$ calculation therefrom:
    $TiO_2$=80 g
    $H_2O$=18 g
    total=98 g/mol
    % $H_2O$=(18/98)×100=18%
Sulphate Removal from Concentrated Brine:

Sulphate removal efficiency was determined by adding 5.4 g of hydrous titanium oxide, $TiO_2$-$H_2O$ to 50 ml of a solution composed of 10 g/l $Na_2SO_4$ in concentrated brine (300 g/l NaCl). The ratio of hydrous titanium oxide to sulphate is 15.6 moles $TiO_2$-$H_2O$/mole $SO_4^=$. To this slurry 0.5 ml portions of 5 N HCl were added and the mixture heated to 70° C. The pH and sulphate levels were measured after each addition of acid. The efficiency for sulphate removal is shown in Table 4 as a function of pH.
Table 4: Sulphate Removal Efficiency as a Function of pH for $TiO_2$-$H_2O$.

|  | pH = 4 | pH = 3 | pH = 2 |
| --- | --- | --- | --- |
| Efficiency in moles $SO_4^=$/moles IX | 0.006 | 0.008 | 0.015 |

EXAMPLE 5

Hydrous zirconium oxide was prepared by dissolving 15 g of hydrated zirconium oxychloride ($ZrOCl_2$-$8H_2O$) in 400 ml of $H_2O$ and precipitating by adding 75 ml of 2.5 M NaOH dropwise with stirring. The resulting solid was filtered, washed and dried at 120° C. for 1.5 hrs.
Characterization of Hydrous Zirconium Oxide.
  weight: 9.7 g
  Degree of hydration: $ZrO_2$-$5H_2O$
    $ZrO_2$=123 g
    5 $H_2O$=90 g
    total=213 g
    % $H_2O$=(90/213)×100 42%
Sulphate Removal from Aqueous Solution:

Sulphate removal was determined by adding 4.9 g of hydrous zirconiumoxide, $ZrO_2$-$5H_2O$ to 50 ml of a solution of 7 g/l $Na_2SO_4$. The ratio of hydrous zirconium oxide to sulphate was 10 moles $ZrO_2$-$5H_2O$/mole $SO_4^=$. To this slurry 0.5 ml portions of HCl were added and the mixture heated to 70° C. The pH and sulphate level were measured after each addition of acid. The efficiency for sulphate removal is shown in Table 5.
Table 5: Sulphate Removal Efficiency as a Function of pH for $ZrO_2$-$5H_2O$

|  | pH = 4 | pH = 3 | pH = 2 |
| --- | --- | --- | --- |
| Efficiency in moles $SO_4^=$/moles IX | 0.050 | 0.055 | 0.060 |

EXAMPLE 7

Hydrous cerium oxide was prepared by dissolving 200 g of ammonium ceric(IV) nitrate $(NH_4)_2Ce(NO_3)_6$ in 600 ml $H_2O$ and precipitating by addition of 800 mmol of ammonium hydroxide. The light yellow solid was filtered, washed and dried at 125° C. overnight to produce the hydrous cerium oxide product (70 g). Scanning electron microscopy of hydrous cerium oxide revealed irregularly shaped particles with a particle size from 2–40 microns.
Characterization of Hydrous Cerium Oxide.
  weight: 70 g
  Degree of hydration: $CeO_2$-$H_2O$
  % $H_2O$ as calculated therefrom:
    $CeO_2$ 172 g
    $H_2O$ 18 g
    total 190 g
    % $H_2O$=(18/190)×100=9.5%
sulphate Removal from Concentrated Brine: Sulphate removal efficiency was determined by adding 7.0 g of hydrous cerium oxide $CeO_2$-$H_2O$ to 50 ml of a solution composed of 10 g/l $Na_2SO_4$ in concentrated brine (300 g/l NaCl). The ratio of hydrous cerium oxide to sulphate was 10 moles $CeO_2$-$H_2O$/mole $SO_4^{32}$. To this slurry were added 0.5 ml portions of 5N HCl and the mixture was heated to 70° C. The pH and sulphate level were measured after each addition of acid. The efficiency for sulphate removal is shown in Table 6 as a function of pH.
Table 6: Sulphate Removal Efficiency as a Function of pH for $CeO_2$—$H_2O$

|  | pH = 4 | pH = 3 | pH = 2 |
| --- | --- | --- | --- |
| Efficiency in moles $SO_4^=$/moles IX | 0.060 | 0.063 | 0.065 |

EXAMPLE 8

Anhydrous titanium(ic) oxide $TiO_2$[Fisher Scientific]100 g, was washed with 500 ml of $H_2O$, filtered and dried at 120°

C. overnight. This material was used to prepare $CeO_2$-$4H_2$. Scanning electron microscopy revealed an extremely homogeneous powder sample with agglomerates of 0.5 micron particles.

Sulphate Removal from Concentrated Brine:

Sulphate removal efficiency was determined by adding 5 g of $TiO_2$ to 50 ml of a solution of 10 g/l $Na_2SO_4$ in concentrated brine (300 g/l NaCl). The ratio of $TiO_2$ to sulphate is 18 moles $TiO_2$/mole $SO_4^{32}$. To this slurry 0.5 ml portions of 5 N HCl was added and the mixture heated to 70° C. The pH and sulphate level were measured after each addition of acid.

Anhydrous titanium oxide is ineffective for removal of sulphate from brine.

IMPROVED SULPHATE REMOVAL EFFICIENCY OF COMPOSITE MATERIAL

TABLE 7: Sulphate Removal Efficiency for Selected Hydrous Oxide Ion Exchangers in Brine as a Function of pH.

| | Efficiency | | |
|---|---|---|---|
| Ion Exchanger | pH = 4 | pH = 3 | pH = 2 |
| 1. $CeO_2$—$H_2O$ | 0.060 | 0.063 | 0.065 |
| 2. $TiO_2$ | 0.00 | 0.00 | 0.00 |
| 3. 10% $CeO_2$—$4H_2O/TiO_2$ | 0.16 | 0.19 | 0.21 |
| 4. $CeO_2$—$H_2O$ | 0.060 | 0.063 | 0.065 |
| 5. $TiO_2$—$H_2O$ | 0.006 | 0.008 | 0.015 |
| 6. 10% $CeO_2$—$2H_2O$/$TiO_2$—$H_2O$ | 0.014 | 0.023 | 0.033 |
| 7. $ZrO_2$—$7H_2O$ | 0.050 | 0.055 | 0.060 |
| 8. $CeO_2$—$H_2O$ | 0.060 | 0.063 | 0.065 |
| 9. 17% $ZrO_2$—$7H_2O$/$CeO_2$—$H_2O$ | 0.080 | 0.085 | 0.090 |

TABLE 8

CALCULATION OF SYNERGISTIC EFFECT OF MIXED HYDROUS OXIDE RESULTING IN IMPROVED SULPHATE REMOVAL EFFICIENCY

| | EFFICIENCY | | |
|---|---|---|---|
| | pH = 4 | pH = 3 | pH = 2 |
| 10 wt % $CeO_2$—$4H_2O/TiO_2$ | | | |
| Predicted | 0.060 | 0.063 | 0.065 |
| Actual | 0.16 | 0.19 | 0.21 |
| Improvement | 2.7× | 3.0× | 3.2× |
| 10 wt % $CeO_2$—$2H_2O/TiO_2$—$H_2O$ | | | |
| Predicted | 0.009 | 0.010 | 0.017 |
| Actual | 0.014 | 0.023 | 0.033 |
| Improvement | 1.6× | 2.3× | 1.9× |
| 17 wt % $ZrO_2$—$7H_2O/CeO_2$—$H_2O$ | | | |
| Predicted | 0.06 | 0.060 | 0.062 |
| Actual | 0.08 | 0.085 | 0.09 |
| Improvement | 1.3× | 1.4× | 1.4× |

Efficiency is defined as the moles of sulphate removed per mole of ion exchanger. For example, $CeO_2$-$H_2O$ has an efficiency of 0.06 at pH 4, i.e. 1 mole of $CeO_2$-$H_2O$ removes 0.06 moles of sulphate at pH 4.

Efficiency calculation for 10% $CeO_2$-$4H_2O/TiO_2$:

Because $TiO_2$ is inert for sulphate removal the efficiency was calculated as the moles of sulphate removed per mole of hydrous oxide (NOT per mole of hydrous oxide and inert support.) Referring to the table, the efficiency for sulphate removal at pH 4 is 0.16 moles of sulphate per mole of $CeO_2$-$4H_2O$ when the $CeO_2$-$4H_2O$ is in the form of a 10 wt % dispersion on $TiO_2$. This means that to remove 1 mole of sulphate, 6.2 moles of dispersed hydrous cerium oxide are required.

Improvement calculation for 10% $CeO_2$-$4H_2O/TiO_2$:

Because of the added weight of the support material, gram for gram, the 10% $CeO_2$-$4H_2O/TiO_2$ removes less sulphate than $CeO_2$-$H_2O$ alone. But gram for gram of hydrous cerium oxide there is an improvement in efficiency.

The improvement is calculated as: the efficiency of the mixed oxide (per mole of active hydrous cerium oxide)/the efficiency of hydrous cerium oxide.

i.e. 0.16/0.06=2.67

Efficiency calculation for 10 wt % $CeO_2$-$2H_2O/TiO_2$-$H_2O$:

10% $CeO_2$-$2H_2O/TiO_2$-$H_2O$ refers to a material composed of 10 weight % $CeO_2$-$2H_2O$ (or $Ce(OH)_4$, 208.15 g/tool) and 90 wt % $TiO_2$-$H_2O$ (97.894 g/mol). This corresponds to a material with the molar ratio of 1 mole $CeO_2$-$2H_2O$ to 19 moles of $TiO_2$-$H_2O$. Both $CeO_2$-$2H_2O$ and $TiO_2$-$H_2O$ are active for sulphate removal so the efficiency of 10% $CeO_2$-$2H_2O/TiO_2$-$H_2O$ is reported for total moles of hydrous oxide. Therefore at pH 4 the efficiency is 0.014. That is, 0.014 moles of sulphate are removed by one mole of 10wt % $CeO_2$-$2H_2O/TiO_2$-$H_2O$ which is composed of 0.05 moles of $CeO_2$-$2H_2O$ and 0.95 moles of $TiO_2$-$H_2O$.

Improvement calculation for 10wt % $CeO_2$-$2H_2O/TiO_2$-$H_2O$:

The improvement was calculated by dividing the experimental efficiency by a calculated efficiency based on the efficiency of $CeO_2$-$H_2O$ and $TiO_2$-$H_2O$. The calculated efficiency is:

0.05×0.06+0.95×0.006=0.0087

The improvement is calculated as:

0.014/0.0087=1.6

Efficiency calculation for 17 wt % $ZrO_2$-$7H_2O/CeO_2$-$H_2O$.

17 wt % $ZrO_2$-$7H_2O/CeO_2$-$H_2O$ refers to a material composed of 17 wt % $ZrO_2$-$7H_2O$ (249 g/mol) and 83 wt % $CeO_2H_2O$ (190 g/mol). This corresponds to a material with a molar ration of 6.5 moles of $CeO_2$-$H_2O$ to 1 mole of $Zr_2O$-$7H_2O$. Both $ZrO_2$-$7H_2O$ and $CeO_2$-$H_2O$ are active for sulphate removal so the efficiency of 17 wt % $ZrO_2$-$7H_2O/CeO_2$-$H_2O$ is reported for total moles of hydrous oxide. Therefore at pH 4, the efficiency is 0.078, that is 0.078 moles of sulphate are removed by one mole of 17 wt % $ZrO_2$-$7H_2O/CeO_2$-$H_2O$ which is composed of 0.13 moles of $ZrO_2$-$7H_2O$ and 0.87 moles of $CeO_2$-$H_2O$.

Improvement calculation for 17 wt % $ZrO_2$-$7H_2O/CeO_2H_2O$.

The improvement is calculated by dividing the experimental efficiency by a calculated efficiency based on the efficiency of $ZrO_2$-$7H_2O$ and $CeO_2H_2O$. The calculated efficiency at pH 4 is 0.13×0.05+0.87×0.06=0.06

The improvement is calculated as:

0.08/0.06=1.3

EXAMPLE 9

This example is illustrated with reference to FIG. 1, which represents a diagrammatic flow chart of a three-bed ion exchange system.

FIG. 1 shows generally as 10 a dual three-bed ion exchange system consisting of individual parallel series 12 and 12A.

System 12 has beds 14, 16 and 18 connected in series by conduits 20 and 22.

A brine feed line 24 to bed 14 has an acid feed line 26, conduits 20 and 22 have acid feed lines 28 and 30, respectively. Bed 18 has a product exit conduit 32 and a regenerative waste stream exit conduit 34. Bed 14 has an air feed inlet 36, an aqueous base feed inlet 38 and a neutral wash water inlet 40.

System 10 has a parallel bed/column system 12A with like Components denoted with the letter A corresponding to those components and like numerals of system 12.

In operation, a solution consisting of 10 g/l $Na_2SO_4$ in 300 g/l brine feed solution in conduit 24, is first acidified with sufficient HCl via conduit 26 to provide an H+ concentration of 0.01 M. This quantity of acid is sufficient to reduce the sodium sulphate level by 0.7 g/l. The solution is introduced at a rate of 100 ml/min into first bed or column 14 containing 7 kilograms of a composite material composed of 10 wt % hydrous cerium oxide dispersed on granular (500 micron) anhydrous titanium oxide. As the solution contacts the ion exchanger, sulphate is adsorbed and hydroxide released. The released hydroxide is neutralized by acid. Upon exiting bed 14 through conduit 20, the sodium sulphate level of the solution has been reduced to 9.3 g/l and the pH is neutral or slightly acidic. To this 9.3 g/l sodium sulphate solution is again added sufficient HCl via conduit 28 as to provide an H+ concentration of 0.01 M and the solution is introduced at a rate of 100 ml/min to second bed 16 containing 7 kg of a composite material composed of a 10 wt % hydrous cerium oxide dispersed on granular titanium oxide (500 micron particle size). Upon exiting second bed 16 through conduit 22 the sodium sulphate level is reduced to 8.6 g/l and the pH is neutral or slightly acidic. The solution is reacidified via conduit 30 and the process is repeated on third bed. 18. Upon exiting bed 18 through conduit 32 the sulphate level is reduced to 7.9 g/l and the pH is neutral or slightly acidic. In an alternative embodiment this process could be repeated on additional beds/columns to further decrease the sulphate level.

The sulphate containing feed solution is contacted with bed/column system 12 for a period of 4 hours after which the brine flow is redirected to parallel fresh bed/column system 12A, and the used column system 12 is regenerated. To regenerate, air from conduit 36 is first used to displace the remaining sulphate depleted brine from used bed/column system 12 before it is regenerated.

Regeneration is affected by introducing an aqueous solution of 0.3 M sodium hydroxide via feed conduit 38 at a rate of 100 ml/min through system 12 for a period of 25 minutes. The sodium hydroxide displaces the sulphate from the high pH-insoluble ion exchanger. The ion exchanger is regenerated and a waste stream composed of 20 g/l sodium sulphate and some residual sodium chloride from the retained brine solution is collected from exit conduit 34. The pH of this waste stream is neutral or slightly basic. Air from conduit 36 is used to displace solution from the ion exchanger and then a neutral wash water via conduit 40 is introduced to column system 12 at a rate of 100 ml/min for 100 min to remove any excess caustic which would consume acid in the duty cycle resulting in less sulphate removal. Air is also used to subsequently displace the wash solution to waste conduit 34 and bed system 12 is ready to be returned to duty.

In an analogous manner system 12A is used for sulphate removal and similarly regenerated.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

We claim:

1. A method for removing sulphate ions from an aqueous solution of an alkali metal halide containing sulphate ions, which method comprises contacting said solution with a particulate, composite ion-exchange material comprising a first hydrous oxide of a first metal selected from the group consisting of titanium, zirconium and cerium dispersed on the surface of a support comprising a brine solution compatible material, wherein said support comprises a second hydrous oxide of a second metal selected from the group consisting of titanium, zirconium and cerium, provided that when said first metal and said second metal are the same, about 90% by number of the particles of said second hydrous oxide is at least ten times greater in size than 90% by number of the particles of said first hydrous oxide.

2. A method as claimed in claim 1 wherein said first hydrous oxide and said second hydrous oxide have the formula $MO_2 \cdot xH_2O$, wherein M is selected from the group consisting of titanium, zirconium and cerium and X is selected from 0.3 to 7.

3. A method as claimed in claim 1 wherein said first hydrous oxide has a weight loading on said support of from 1 to 50% w/w.

4. A method as claimed in claim 3 wherein said first hydrous oxide has a weight loading on said support material of from 8 to 20% w/w.

5. A method as claimed in claim 1 wherein said first hydrous oxide is finely dispersed on said support.

6. A method as claimed in claim 1 wherein said first hydrous oxide comprises hydrous cerium oxide and zirconium oxide; and said second hydrous oxide comprises hydrous titanium oxide and cerium oxide and has a stable surface to support said first hydrous oxide.

7. A method as claimed in claim 1 wherein said first hydrous oxide comprises hydrous zirconium oxide; said second hydrous oxide comprises hydrous zirconium oxide, and has a stable surface for said first hydrous zirconium oxide.

8. A method as claimed in claim 1 wherein said first hydrous oxide comprises hydrous cerium oxide; said second hydrous oxide comprises hydrous cerium oxide, and has a stable surface for said first hydrous cerium oxide.

9. A method as claimed in claim 1 wherein said dispersed first hydrous oxide has a particle size selected from the range 0.01 μm–30 μm and said support has a particle size in the range of 0.1 to 300 μm.

10. A method as claimed in claim 1 wherein said aqueous solution is mixed with said composite ion-exchange material at a pH selected from 2 to 6.

11. A method as claimed in claim 1 wherein said aqueous solution further comprises sodium chlorate.

12. A method as claimed in claim 1 wherein said dispersed first hydrous oxide has a particle size in the range of 0.1 to 100 μm and said support has a particle size in the range of 300 to 1500 μm.

13. A method for removing sulphate ions from an aqueous solution of an alkali metal halide containing sulphate ions by contacting with a particulate, composite ion-exchange material comprising a hydrous oxide of a metal selected from the group consisting of titanium, zirconium and cerium, dispersed on a support comprising a brine solution compatible material, where in said support comprises a second hydrous oxide of a second metal selected from the group consisting of titanium, zirconium and cerium, provided that when said first metal and said second metal are the same, about 90% by number of the particles of said second hydrous oxide is at least ten time greater in size than 90% by number of the particles of said first hydrous oxide, said method being a multi-stage one comprising contacting a first aqueous solution of an alkali metal halide containing sulphate ions with a first portion of said particulate composite material to provide a first sulphate depleted solution; separating said first sulphate depleted solution from said composite material; contacting said first sulphate depleted solution with a second portion of said particulate composite material to provide a second sulphate-depleted solution; and separating said second sulphate-depleted solution from said second portion of said particulate composite material.

14. A method as claimed in claim 13, wherein said contacting steps are carried out with ion-exchange columns containing said composite materials.

15. A method as claimed in claim 13 wherein said contacting steps are carried out at a pH not less than 2.

* * * * *